United States Patent [19]

Okumura et al.

[11] Patent Number: 5,704,333
[45] Date of Patent: Jan. 6, 1998

[54] FUEL INJECTION SYSTEM FOR A LEAN BURN ENGINE

[75] Inventors: Takeshi Okumura, Susono; Shigeo Furuno, Fuji; Shizuo Sasaki, Numazu, all of Japan

[73] Assignee: Toyota Jidosha Kabushiki Kaisha, Toyota, Japan

[21] Appl. No.: 733,167

[22] Filed: Oct. 17, 1996

[30] Foreign Application Priority Data

Oct. 19, 1995 [JP] Japan ................................. 7-271224
Jun. 26, 1996 [JP] Japan ................................. 8-165920

[51] Int. Cl.$^6$ .............................. F02M 61/14; F02B 17/00; F02B 31/00
[52] U.S. Cl. ........................................... 123/308; 123/430
[58] Field of Search ........................... 123/302, 305, 123/308, 430, 432, 470

[56] References Cited

U.S. PATENT DOCUMENTS 5,167,211  12/1992  Fukuma et al. ......................... 123/308
5,291,865   3/1994  Sasaki ................................. 123/308 X

FOREIGN PATENT DOCUMENTS

4439918  5/1995  Germany .
60-125752  7/1985  Japan .
62-91619   4/1987  Japan .
1-121509   5/1989  Japan .
4-1669     1/1992  Japan .
6-249108   9/1994  Japan .

*Primary Examiner*—Tony M. Argenbright
*Attorney, Agent, or Firm*—Oliff & Berridge, P.L.C.

[57]  ABSTRACT

According to the present invention, each of the cylinders of an engine is provided with a swirl port, which generates a swirl in the cylinder, and a conventional straight port. A swirl control valve is disposed in an inlet air passage connected to the straight port for blocking the flow of inlet air through the straight port. A fuel injection port is disposed in each of the swirl port and the straight port. The fuel injection port in the straight port is disposed at the position adjacent to the upper edge of the valve seat of the straight port inlet valve. When the swirl control valve blocks the inlet air passage leading to the straight port, fuel is injected from the fuel injection port of the straight port in the latter half of the intake stroke of the piston. The direction of fuel injection from the fuel injection port in the straight port is determined in such a manner that fuel is injected in the direction between the center axis of the cylinder and the center axis of the stem of the valve element of the inlet valve toward the opposite wall of the cylinder head or the upper part of the opposite wall of the cylinder.

4 Claims, 10 Drawing Sheets

FUEL INJECTION SYSTEM FOR A LEAN BURN ENGINE

BACKGROUND OF THE INVENTION

1. Field of the Invention

The present invention relates to a fuel injection system suitable for a lean burn engine which is operated on a lean air-fuel mixture having an air-fuel ratio higher than a stoichiometric air-fuel ratio.

2. Description of the Related Art

A fuel injection system for a lean burn engine which enables a stable combustion of an air-fuel mixture having an air-fuel ratio higher than a stoichiometric air-fuel ratio by generating a swirl of inlet air in the cylinder around the center axis thereof is, for example, disclosed in Japanese Unexamined Patent Publication (Kokai) No. 62-91619.

The fuel injection system in the '619 publication has two fuel injection valves, i.e., one for injecting fuel into a swirl port of the cylinder which generates an inlet air swirl in the cylinder and one for injecting fuel into a conventional straight inlet port of the cylinder. When the engine is operated on an lean air-fuel mixture, an inlet air passage connected to the straight port is throttled by a swirl control valve to reduce the amount of inlet air flowing into the cylinder through the straight port. Further, when the swirl control valve throttles the inlet air passage, the fuel injection valve on the straight port side injects fuel, at the latter half of the intake stroke, toward the center of the cylinder.

Fuel injected from the fuel injection valve on the swirl port side is carried by inlet air flowing through the swirl port and is diffused in the cylinder. Thus, the fuel injected to the swirl port forms a uniform air-fuel mixture in the cylinder. However, since the fuel injected into the swirl port diffuses into the entire volume of the cylinder, the air-fuel ratio of the air-fuel mixture becomes relatively high. In order to ignite this uniform air-fuel mixture by a spark plug, it is required to increase the amount of the fuel injected into the swirl port to, thereby lower the air-fuel ratio of the uniform air-fuel mixture in the cylinder. Therefore, if a uniform air-fuel mixture is to be formed in the cylinder, it is difficult to make the air-fuel ratio of the air-fuel mixture sufficiently high (lean).

To solve this problem, in the fuel injection system in the '619 publication, fuel is injected from the fuel injection valve in the straight port, in the latter half of the intake stroke, toward the center part of the cylinder. Further, in the '619 publication, the swirl control valve does not block the straight port completely and a relatively small amount of inlet air flows into the cylinder through the straight port even when the swirl control valve is closed. Fuel injected from the fuel injection valve on the straight port side is carried by the air flow through the straight port and reaches the center part of the cylinder. When the swirl flow is formed in the cylinder, though air flows along the internal surface of the cylinder, air is nearly still near the center axis of the cylinder. Therefore, when the fuel from the straight port reaches the center part of the cylinder, it stays there without diffusing, and forms an air-fuel mixture having a relatively low, i.e., ignitable, air-fuel ratio around a spark plug disposed in the center part of the cylinder.

Thus, according to the fuel injection system in the '619 publication, an ignitable air-fuel mixture having a relatively low air-fuel ratio is formed around the spark plug disposed at the center part of the cylinder by the fuel injected into the straight port, in addition to a uniform air-fuel mixture having a relatively low air-fuel ratio formed by the fuel injected into the swirl port in the cylinder. Namely, the air-fuel mixture is stratified in the radial direction of the cylinder. Therefore, only the air-fuel ratio of the air-fuel mixture around the spark plug is made sufficiently low to allow it to be ignited by the spark plug while maintaining the air-fuel ratio of the air-fuel mixture in the cylinder as a whole higher than a stoichiometric air-fuel ratio.

In the fuel injection system in the '619 publication, the flow of inlet air through the straight port is required even when the swirl control valve is closed, in order to prevent the spark plug from being wetted by the fuel injected into the straight port. Since the fuel injected into the straight port is directed to the center part of the cylinder where the spark plug is disposed, if there is no flow of inlet air through the straight port, the injected fuel reaches the spark plug without being atomized by the flow of inlet air and is attached to the spark plug. Therefore, the fuel injection system in the '619 publication requires the flow of inlet air through the straight port in order to atomize injected fuel even when the swirl control valve is closed.

However, due to this inlet air flowing through the straight port, the stratification of the air-fuel mixture in the radial direction of the cylinder is sometimes disturbed in the fuel injection system of the '619 publication. When fuel is injected into the straight port, fuel is atomized by the flow of inlet air and widely diffuses into the straight port before it flows into the cylinder. This diffused fuel is carried by the flow on inlet air and hits the wall surface of the inlet port and the back side of the valve element of the inlet valve and, thereby, the fuel is further atomized. This atomized fuel is carried by the inlet air flowing through the straight port and flows into the cylinder through the annular opening between the periphery of the valve element and the valve seat of the inlet valve. Since the inlet air flowing through the inlet valve has a relatively large velocity in the downward direction, the fuel carried by the inlet air flows downwards from the inlet port into the cylinder. When the fuel injected into the straight port flows into the cylinder in the latter half of the intake stroke of the piston, a strong swirl of inlet air flowing through the swirl port is already formed in the cylinder. In the swirl, inlet air flows helically downwards from the inlet valve of the swirl port along the wall surface of the cylinder. This swirl passes through the portion directly below the inlet valve of the straight port. Therefore, the atomized fuel flows into the cylinder downwards from the straight port and is carried away by the swirl in the cylinder. In this case, the fuel flowing into the cylinder from the straight port does not stay at the center of the cylinder but diffuses over the entire volume of the cylinder. Therefore, the air-fuel mixture is not properly stratified in the radial direction of the cylinder, and an ignitable air-fuel mixture is not formed around the spark plug.

Namely, in the fuel injection system in the '619 publication, the fuel injected into the straight port does not reach the center part of the cylinder, but is carried by the swirl in the cylinder to form a uniform air-fuel mixture in the cylinder.

SUMMARY OF THE INVENTION

In view of the problems in the related art as set forth above, the object of the present invention is to provide a fuel injection system for a lean burn engine which is capable of effectively stratifying the air-fuel mixture in the radial direction of the cylinder in order to form an air-fuel mixture of an ignitable air-fuel ratio around the spark plug while keeping the air-fuel ratio of the air-fuel mixture in the cylinder as a whole at a lean air-fuel ratio.

This object is achieved by a fuel injection system, for a lean burn engine according to the present invention. In one aspect of the present invention, each of the cylinders of the engine is equipped with a conventional straight inlet port and a swirl inlet port which generates a swirl of inlet air flowing therethrough into the cylinder, a first inlet air passage connected to the straight inlet port, a second inlet air passage connected to the swirl inlet port, and a swirl control valve disposed in the first inlet air passage for blocking the first inlet air passage when the engine is operated at a predetermined operating condition. The fuel injection system includes a fuel injection valve equipped with two injection holes which are connected to a straight port fuel injection port disposed on the wall of the straight inlet port and a swirl port fuel injection port disposed on the wall of the swirl inlet port, which inject fuel into the straight inlet port and the swirl inlet port through the respective fuel injection ports. Further, the fuel injection valve injects fuel in a latter half of the intake stroke at least when the swirl control valve is being closed, and the straight port fuel injection port is disposed at a position adjacent to the inlet valve seat of the straight inlet port and injects fuel in the direction between the center axis of the cylinder and the stem of the inlet valve element so that the injected fuel moves toward the opposite wall of the cylinder head or the upper part of the opposite cylinder wall.

According to this aspect of the invention, the inlet air passage connected to the straight inlet port is blocked by the swirl control valve, and the flow of air does not exist when fuel is injected into the straight inlet port. Further, the straight port fuel injection port is disposed adjacent to the inlet valve seat of the inlet valve. Therefore, fuel injected into the straight inlet port is not diffused by the flow of inlet air, and passes through the clearance between the valve element in the opening position and the valve seat of the inlet valve into the cylinder without impinging on the valve element and the valve seat. Further, since fuel is injected from the straight port fuel injection port pointing toward the opposite wall of the cylinder head or the upper part of the opposite cylinder wall. Therefore, the injected fuel directly reaches the center part of the cylinder without being carried away or being diffused by the swirl in the cylinder. Accordingly, the fuel injected in the straight inlet port stays at the center of the cylinder and forms an air-fuel mixture of an ignitable air-fuel ratio around the spark plug. Namely, the air-fuel mixture in the cylinder is stratified in the radial direction. In this aspect of the invention, pressurized air may be supplied to the fuel injection passage connecting the straight port fuel injection port and the injection hole in order to improve atomization of the injected fuel.

According to another aspect of the invention, there is provided a fuel injection system for a lean burn engine. Each of the cylinders of the engine is equipped with a conventional straight inlet port and a swirl inlet port which generates a swirl of inlet air flowing therethrough into the cylinder, a first inlet air passage connected to the straight inlet port, a second inlet air passage connected to the swirl inlet port, and a swirl control valve disposed in the first inlet air passage for blocking the first inlet air passage when the engine is operated at a predetermined operating condition. The fuel injection system includes a fuel injection valve equipped with two injection holes which are connected to a straight port fuel injection port disposed on the wall of the straight inlet port and a swirl port fuel injection port disposed on the wall of the swirl inlet port, which inject fuel into the straight inlet port and the swirl inlet port through the respective fuel injection ports. Further, the fuel injection valve injects fuel in a latter half of the intake stroke, at least when the swirl control valve is being closed, and the straight port fuel injection port is disposed at a position adjacent to the inlet valve seat of the straight inlet port and injects fuel in the direction between the center axis of the cylinder and the stem of the inlet valve element toward the lower edge of the inlet valve seat of the straight inlet port.

According to this aspect of the invention, fuel is injected in the direction between the center axis of the cylinder and the stem of the inlet valve seat of the straight inlet port toward the lower edge of the inlet valve seat of the straight inlet port on the portion near the center axis of the cylinder. This fuel hits the lower edge of the inlet valve seat without being diffused, and is atomized by the impingement. Therefore, the atomized fuel flows into the cylinder through the portion of the inlet valve near the center of the cylinder. As explained before, there is no swirl in the center of the cylinder in the latter half of the intake stroke. Therefore, the atomized fuel which flows into the cylinder from the part of the inlet valve of the straight inlet port near the center axis of the cylinder stays at the center of the cylinder and forms an air-fuel mixture having an ignitable air-fuel ratio. Thus, according to this aspect of the present invention, the air-fuel mixture in the cylinder is stratified in the radial direction.

According to another aspect of the invention, there is provided a fuel injection system for a lean burn engine. Each of the cylinders of the engine is equipped with a conventional straight inlet port and a swirl inlet port which generates a swirl of inlet air flowing therethrough into the cylinder, a first inlet air passage connected to the straight inlet port, a second inlet air passage connected to the swirl inlet port, and a swirl control valve disposed in the first inlet air passage for blocking the first inlet air passage when the engine is operated at a predetermined operating condition. The fuel injection system includes a fuel injection valve equipped with two injection holes which are connected to a straight port fuel injection port disposed on the wall of the straight inlet port and a swirl port fuel injection port disposed on the wall of the swirl inlet port which inject fuel into the straight inlet port and the swirl inlet port through the respective fuel injection ports. Further, the fuel injection valve injects fuel in a latter half of the intake stroke, at least when the swirl control valve is being closed, and the straight port fuel injection port is disposed at a position adjacent to the inlet valve seat of the straight inlet port and injects fuel toward the back side of the valve element of the inlet valve of the straight inlet port in such a manner that the injected fuel hits the surface area of the back side of the valve element bounded by a line connecting the center axis of the cylinder and the center axis of the stem of the valve element and a line connecting the center axis of the stem of the valve element and the straight port fuel injection port and fuel deflected by said surface area approaches the center axis of the cylinder.

In this aspect of the invention, the fuel injected from the straight port fuel injection port impinges on the back side of the inlet valve element on the side near the spark plug. Fuel is atomized by the impingement and deflected in the direction approaching the spark plug. Further, due to a three-dimensional shape of the back side of the valve element, the fuel is deflected from the back side surface of the valve element in the direction slightly above the horizontal plane. Therefore, the deflected fuel reaches the center of the upper portion of the cylinder without impinging on the top surface of the cylinder head and forms an air-fuel mixture of an ignitable air-fuel ratio near the spark plug. Thus, according to this aspect of the invention, the air-fuel mixture in the cylinder is stratified in the radial direction.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Figure 1:
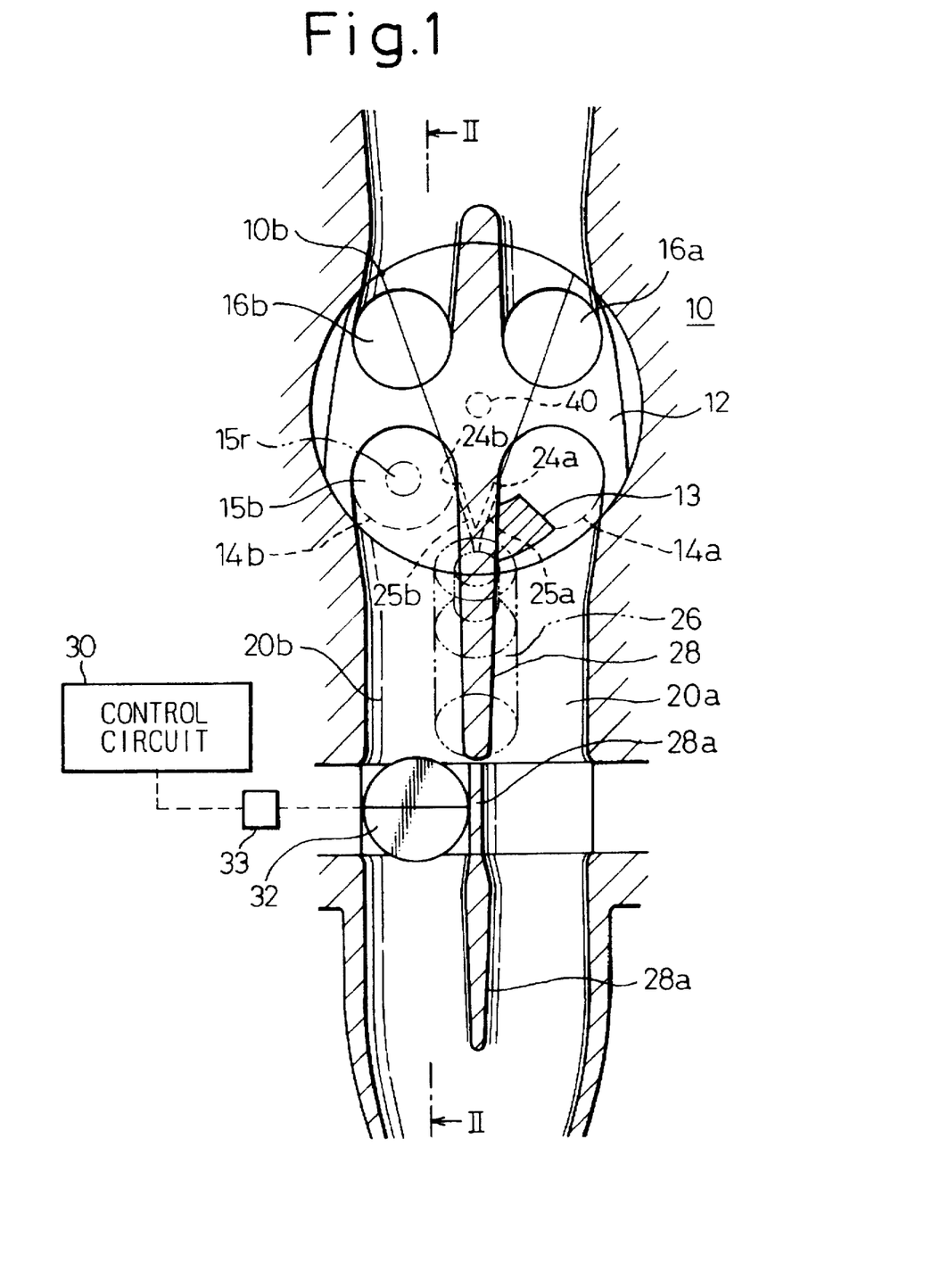
FIG. 1 schematically illustrates an embodiment of the fuel injection system of the present invention when applied to an automobile engine.
Figure 2:
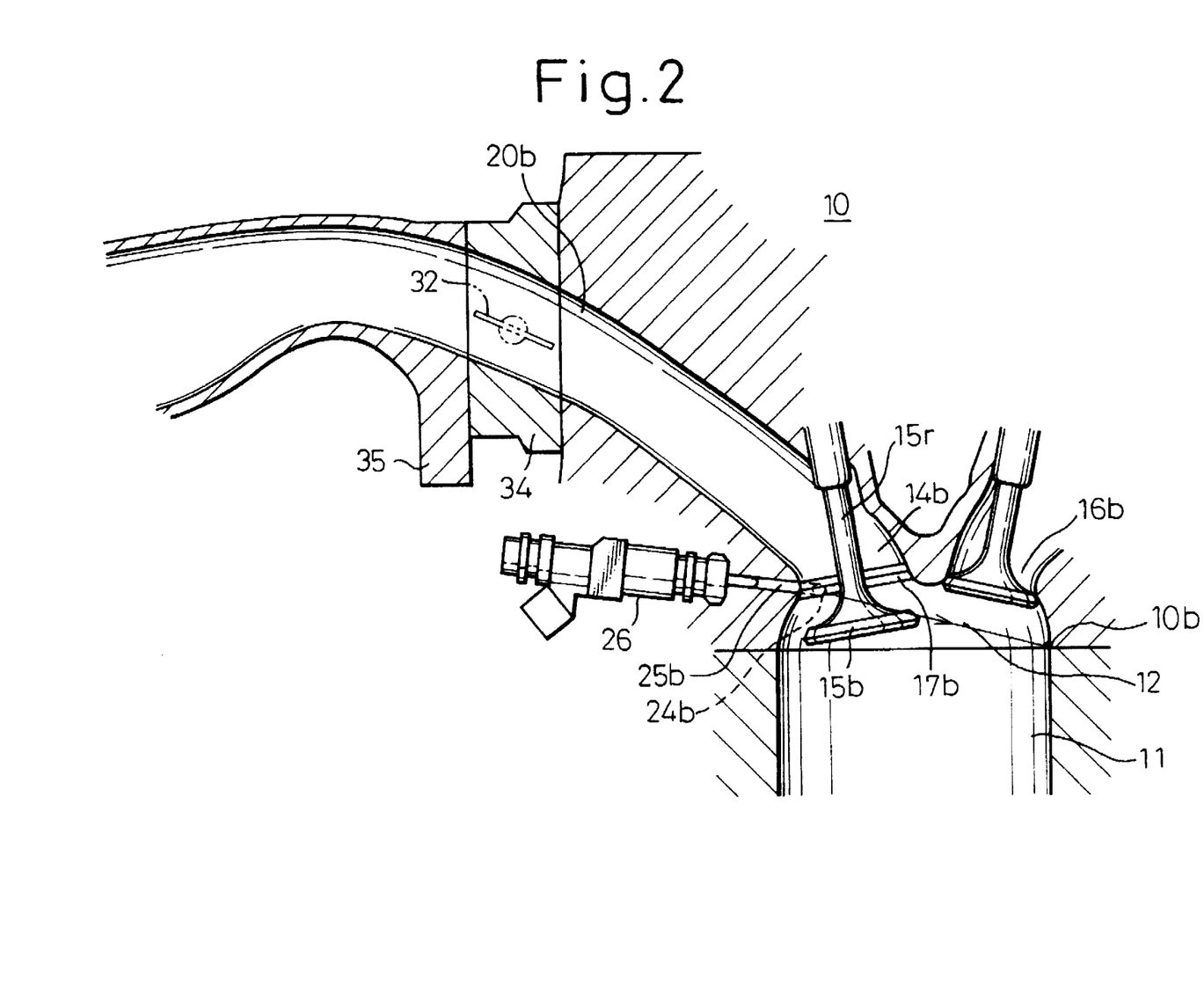
FIG. 2 shows a sectional view taken along line II—II in FIG. 1.

FIGS. 1 and 2 schematically illustrate an embodiment of the fuel injection system according to the present invention. In FIGS. 1 and 2, reference numeral 10 designates a cylinder head of an engine. In this embodiment, a multiple cylinder engine for an automobile is used, and FIGS. 1 and 2 illustrate one of the cylinders of the engine. In FIGS. 1 and 2, reference numerals 11 and 12 designate a cylinder of the engine and a combustion chamber formed in the upper part of the cylinder 11, respectively. In this embodiment, the combustion chamber 12 is a 4-valve type combustion chamber which is provided with two inlet ports 14a, 14b and two exhaust ports 16a, 16b. A spark plug 40 is disposed at the center of the combustion chamber 12.

In FIG. 1, a first inlet port 14a is formed as a swirl port which generates a swirl of inlet air flowing therethrough in the cylinder 11. For this purpose, the first inlet port 14a is provided with a helical projection 13 on the wall of the port 14a. The projection 13 deflects inlet air flowing in the cylinder thorough the port 14a, to thereby generate a swirl in the cylinder 11. A second inlet port 14b is formed as a conventional straight port without the helical projection, and inlet air passes through the second inlet port 14b and flows straight into the cylinder. Inlet air passages 20a and 20b which are connected to the first and second inlet port 14a and 14b, respectively, are formed in the cylinder head 10. The inlet air passages 20a and 20b are separated by a division wall 28 and act as independent inlet air passages. As best shown in FIG. 2, a fuel injection valve 26 is disposed at the lower portion of the division wall 28 in this embodiment. The fuel injection valve 26 has two injection holes on the valve body thereof for injecting pressurized fuel. These injection holes are connected to fuel injection ports 24a and 24b disposed on the wall of the inlet ports 14a and 14b via fuel injection passages 25a and 25b, respectively, formed in the cylinder head 10. The locations of the fuel injection ports 24a and 24b are explained later in detail.

As shown in FIGS. 1 and 2, a swirl control valve 32 is disposed in the inlet air passage 20b leading to the straight port 14b. The swirl control valve 32 is a butterfly type valve having a plate type valve element that takes either an open position or a closed position. The swirl control valve 32 is closed when the engine is operated at a low load. When the swirl control valve 32 is closed, the inlet air passage 20b is completely blocked, and substantially no inlet air flows through the inlet air passage 20b. Therefore, when the swirl control valve 32 is closed, inlet air flows into the cylinder 11 only through the swirl port 14a. Since inlet air passing through the swirl port 14b is deflected by the projection 13, a strong swirl around a center axis of the cylinder is generated in the cylinder 11 when the swirl control valve 32 is closed. Due to this swirl, a strong downward helical air flow starting from the inlet port 14a is formed within the cylinder 11 during the intake stroke of the cylinder.

When the swirl control valve 32 is in the open position, since the flow resistance of the inlet air passage 20b is much lower than that of the inlet air passage 20a, a large amount of intake air flows through the inlet air passage 20b and flows into the cylinder 11 through the inlet port 14b. Therefore, the amount of inlet air supplied to the cylinder 11 is largely increased and, thereby, the output of the engine is increased.

In FIG. 1, reference numeral 30 shows a control circuit of the engine which also controls the opening and closing operation of the swirl control valve 32. Reference numeral 33 is an actuator for operating the swirl control valve 32. The actuator 33 is of an appropriate type such as a vacuum actuator, solenoid actuator or a stepper motor. The control circuit 30 monitors the operating conditions of the engine, and blocks the inlet air passage 20b leading to the straight port 14b by closing the swirl control valve 32 in a low load operation of the engine.

FIG. 2 shows a sectional view taken along the line II—II in FIG. 1. As shown in FIG. 2, an inlet manifold 35 is connected to the cylinder head 10 via a valve assembly 34 of the swirl control valve 32. A division wall 28a (FIG. 1) which continuously extends from the division wall 28 is formed in the valve assembly 34 and the inlet manifold 35. Therefore, the inlet air passage 20a and 20b are separated from each other also in the valve assembly 34 and the inlet manifold 35.

In this embodiment, the fuel injection valve 26 is disposed in the cylinder head 10 at the lower portion of the division wall 28 as shown in FIG. 2. The fuel injection port 24b (straight port fuel injection port), which is connected to the corresponding injection hole of the fuel injection valve 26 by the fuel injection passage 25b, is disposed in the straight port 14b at the position adjacent to the valve seat of the straight port side inlet valve. Namely, as shown in FIGS. 1 and 2, the fuel injection port 24b of the straight port 14b is disposed at the position adjacent to the upper edge of the valve seat 17b on the cylinder center axis side thereof. Further the fuel injection port 24b and the fuel injection passage 25b are arranged so that they point at the wall of the cylinder head 10 or the upper portion of the wall of the cylinder 11 below the exhaust port 16b opposite to the inlet port 14b through the portion between the center axis of the stem 15r of the valve element 15b and the center axis of the cylinder. For example, as shown in FIGS. 1 and 2, the fuel injection port 24b and the fuel injection passage 25b in this embodiment are arranged in such a manner that they point at the joint portion 10b between the cylinder 11 and the cylinder head 10 below the opposite exhaust port 16b. The fuel injection port 24a and the fuel injection passage 25a on the swirl port 14a in this embodiment are also arranged in the same manner, i.e., the fuel injection port 24a and the fuel injection passage 25a point at the joint portion between the cylinder 11 and the cylinder head 10 below the opposite exhaust port 16a.

Figure 3A:
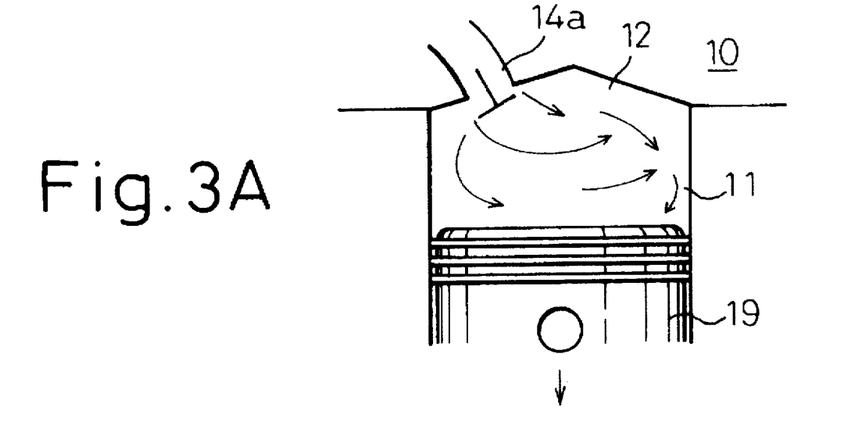
FIGS. 3A, 3B and 3C are the schematic drawings illustrating the flow of inlet air in the cylinder in the latter half of the intake stroke and at the beginning of the compression stroke.
Figure 3B:
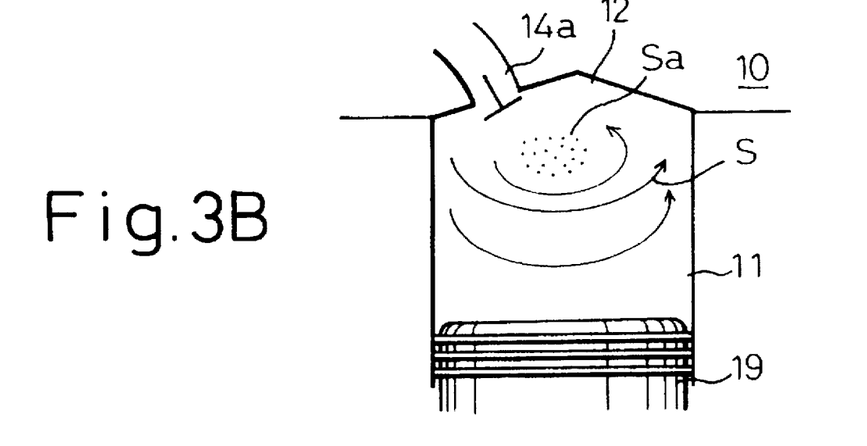
Figure 3C:
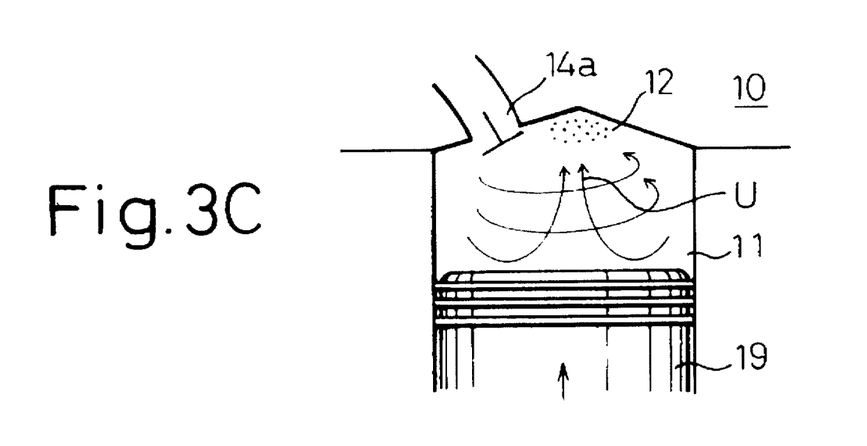

Next, the behavior of the fuel injected from the fuel injection ports 24a and 24b is explained. FIGS. 3A through 3C schematically illustrate the modes of flow of inlet air within the cylinder 11 during the intake stroke and the compression stroke when the swirl control valve 32 is in closed position. FIG. 3A shows the flow in the cylinder 11 at an early stage in the intake stroke. Since the swirl control valve 32 is closed, inlet air flows into the cylinder 11 only from the swirl port 14a in the intake stroke. In the early stage of the intake stroke, the flow in the cylinder is disturbed by the downward movement of the piston 19, and a stable swirl is not formed within the cylinder (FIG. 3A). FIG. 3B shows the flow in the cylinder 11 in the latter half of the intake stroke. Since the speed of the downward motion of the piston is small in this period, inlet air from the swirl port 14a forms a swirl having a downward helical flow path in the cylinder 11 without being disturbed by the downward motion of the piston 19. Therefore, a strong, stable swirl around the center axis of the cylinder 11, as indicated by S in FIG. 3B, is formed in the cylinder 11 at the end of the intake stroke. In the swirl S, the velocity of the flow in the circumferential direction of the cylinder 11 is large at the portion near the wall of the cylinder 11. However, the circumferential velocity of the flow becomes smaller as it approaches the center axis of the cylinder and, thereby, a region Sa which is almost still is formed around the center axis of the cylinder.

Fuel is injected from the fuel injection ports 24a and 24b at the latter half of the intake stroke in which the strong swirl S in FIG. 3B is formed. In this case, the fuel injected from the fuel injection port 24a in the swirl port 14a is atomized by the flow of inlet air passing through the swirl port 14a, and flows into the cylinder 11 with inlet air. Therefore, the fuel injected from the fuel injection port 24a is carried by the swirl S and uniformly diffuses in the cylinder 11. Namely, fuel injected from the fuel injection port 24a in the swirl port 14a in the latter half of the intake stroke forms a lean, uniform air-fuel mixture in the cylinder 11.

On the other hand, fuel is injected from the fuel injection port 24b of the straight port 14b in the direction between the stem 15r and the center axis of the cylinder 11 as shown in FIG. 1. Therefore, the injected fuel proceeds in the direction of the center still area Sa of the swirl S in the cylinder 11. The fuel injection port 24b is disposed at the position adjacent to the valve seat 17b of the inlet valve of the straight port 14b, and the distance between the fuel injection port 24b and the inlet valve opening is very small. Further, no inlet air flow exists when the swirl control valve 32 is closed in this embodiment. Therefore, the fuel injected from the fuel injection port 24b passes through the clearance between the valve element 15b and the valve seat 17b, and reaches the center still region Sa of the swirl S without being diffused by the flow of inlet air, or impinging on the valve element 15b. Further, as shown in FIG. 2, the fuel injection port 24b and the fuel injection passage 25b point at the wall of the cylinder head 10 or the upper part of the wall of the cylinder 11 below the opposite exhaust port 16b. Therefore, the fuel is injected from the fuel injection port 24b in the nearly horizontal direction. This enables the injected fuel to reach the center still region Sa formed in the upper part of the cylinder 11. Thus, fuel injected from the fuel injection port 24b of the straight port 14b stays in the center region of the upper part of the cylinder 11 and forms a relatively rich air-fuel mixture.

During the compression stroke, an upward flow U is generated by the upward motion of the piston as shown in FIG. 3C. Therefore, the rich air-fuel mixture formed in the center still region Sa in FIG. 3B is further concentrated in the center of the upper part of the combustion chamber 12. Thus, at a later stage of the compression stroke at which the spark plug generates a spark in the cylinder, a relatively rich, ignitable air-fuel mixture is formed around the spark plug disposed near the center of the combustion chamber 12. This air-fuel mixture around the spark plug 40 is easily ignited by the spark, and flames propagate to the relatively lean air-fuel mixture uniformly formed in the cylinder 11 and, thereby, a stable combustion of the air-fuel mixture occurs over the entire volume of the combustion chamber 12.

As explained above, the fuel injection system in the present embodiment stratifies the air-fuel mixture in the cylinder 11 in the radial direction, to form a relatively rich ignitable air-fuel mixture around the spark plug due to the following features.

(1) Fuel is injected from the fuel injection port 24b of the straight port 14b in the latter half of the intake stroke.

(2) The swirl control valve 32 completely blocks the inlet air passage 20b leading to the straight port 14b to stop the flow of inlet air passing through the straight port 14b.

(3) The fuel injection port 24b of the straight port 14b is disposed at the position adjacent to the upper edge of the valve seat of the inlet valve.

(4) Fuel is injected from the straight port fuel injection port 24b in the direction between the stem 15r of the valve element 15b of the inlet valve and the center axis of the cylinder 11.

(5) Fuel is injected from the straight port fuel injection port 24b toward the opposite wall of the cylinder head 10 or the opposite wall of the upper part of the cylinder 11.

Next, the relationships of the above features (1) through (5) to the stratification of the air-fuel mixture in the radial direction of the cylinder 11 is explained.

The above feature (1) assures that the strong, stable swirl S (FIG. 3B) exists in the cylinder 11 when fuel is injected from the fuel injection port 24b. In the early stage of the intake stroke, the flow in the cylinder 11 is disturbed by the downward motion of the piston and, as explained before, a stable swirl is not formed yet. Therefore, if fuel is injected in this period, the injected fuel is diffused by the turbulence in the cylinder 11 over the entire volume of the cylinder. In this embodiment, the above feature (1) prevents the injected fuel from being diffused throughout the cylinder.

The above features (2) and (3) assures that a major portion of the fuel injected from the fuel injection port 24b reaches the center still region Sa of the swirl S in the cylinder 11 (FIG. 3B). If fuel is injected from the port 24b when the flow of inlet air through the straight port 14b exists, the injected fuel is diffused by the flow of inlet air, and the major portion of the injected fuel falls in the swirl S in the cylinder 11. This causes the amount of fuel reaching the center still region Sa to decrease. In this embodiment, therefore, fuel is injected from the port 24b when the flow of inlet air does not exist in the straight port 14b (the above feature (2)).

Further, in this embodiment, the travel distance of the injected fuel within the straight port is minimized by the above feature (3) in order to prevent dispersion of the injected fuel. When the travel distance of the injected fuel within the inlet port is long, the jet of fuel injected from the fuel injection port divert before passing through the inlet valve even if the flow of inlet air does not exist. In this case, the injected fuel impinges on the back side of the head of the valve element 15b or the wall of the inlet port 14b and falls in the swirl S in the cylinder 11. This causes the amount of fuel reaching the center still region Sa to decrease. In this embodiment, therefore, the fuel injection port 24b is disposed as near to the inlet valve seat 17b as possible to prevent the jet of fuel from diverting before entering the cylinder 11. This enables the jet of fuel from the fuel injection port 24b to pass through the small clearance between the valve seat 17b and the valve element 15b and to reach the center still region Sa directly.

The above features (4) and (5) assure that the fuel injected from the fuel injection port 24b proceeds to the center of the upper portion of the cylinder 11. By the above feature (4), the fuel injected from the port 24b proceeds in the direction of the center axis of the cylinder 11. Further, by the above feature (5), the fuel injected from the port 24b proceeds to the upper portion of the cylinder 11. In the above feature (5) the vertical direction of the injection of the fuel is determined in such a manner that the injected fuel moves toward a point above the portion of the opposite cylinder wall where the swirl S passes. By setting the direction of the fuel injection in this manner, the injected fuel is not carried by the swirl S even when the injected fuel reaches the opposite cylinder wall. Therefore, by the above features (4) and (5), the fuel injected from the port 24b reaches the upper portion of the center still region Sa and forms a relatively rich ignitable air-fuel mixture around the spark plug 40 without being dispersed by the swirl S in the cylinder 11.

Figure 4:
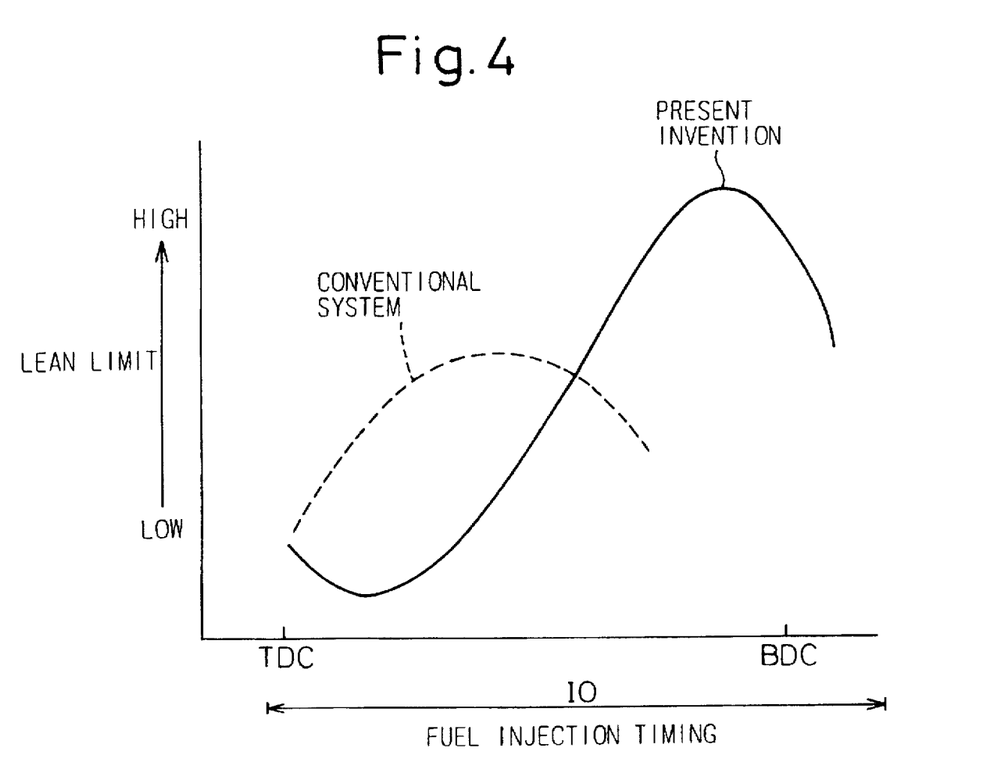
FIG. 4 shows a graph illustrating an effect of fuel injection timing on the lean limit air-fuel ratio.

FIG. 4 is a graph showing a lean limit achieved by the fuel injection system of the present embodiment when the fuel injection timing is changed. The lean limit shown in FIG. 4 is the highest air-fuel ratio in the cylinder which can support stable combustion. The air-fuel ratio in the cylinder means the total air-fuel ratio in the cylinder, i.e., the ratio between the total amount of air supplied to the cylinder and the total amount of the fuel injected from both fuel injection ports 24a and 24b. In FIG. 4, the vertical axis represents the lean limit (air-fuel ratio), and the horizontal axis represents the fuel injection timing. The period IO on the horizontal axis represents the period in which the inlet valves 15a and 15b open, TDC and BDC represent the top dead center and the bottom dead center, respectively. The lean limit of the fuel injection system in the present embodiment is shown by the solid line in FIG. 4.

As shown in FIG. 4, the lean limit becomes higher (more lean) as the fuel injection timing is delayed (i.e., as the fuel injection timing approaches BDC), and the lean limit takes its highest value when the fuel injection is carried out in the latter half of the intake stroke in which a stable swirl exists in the cylinder. When the fuel injection timing is further delayed, the lean limit becomes lower. The reason why the lean limit becomes lower when the fuel injection timing is delayed excessively is because the interval between the fuel injection and the compression stroke of the piston becomes too short, and the fuel injected from the straight port fuel injection port 24b interferes with a back flow in the cylinder caused by the upward motion of the piston 19. This causes the amount of fuel reaching the center still region Sa to decrease. Therefore, in the embodiment explained above, fuel is injected from the straight port fuel injection port 24b in the latter half of the intake stroke at the timing which gives the highest lean limit in FIG. 4.

The broken line in FIG. 4 represents the conventional case in which the fuel injection port of the straight port is disposed at a position distant from the inlet valve. When comparing the solid line (fuel injection system in the present embodiment) and the broken line (conventional fuel injection system), it will be understood that the highest lean limit in the conventional fuel injection system is much lower than that of the present embodiment, and the fuel injection timing which gives the highest lean limit in the conventional fuel injection system is earlier than that of the present embodiment. As explained before, since the distance between the fuel injection port of the straight port and the inlet valve is large in the conventional fuel injection system, a longer time is required for the injected fuel to reach the inlet valve and to enter the cylinder. Therefore, in the conventional fuel injection system, the fuel injection must be carried out at an earlier timing than the present embodiment. Further, in the conventional fuel injection system, since the injected fuel must travel a longer distance before reaching the inlet valve, the jet of fuel diverts before reaching the inlet valve. Therefore, the amount of fuel which reaches the center still region Sa becomes small in the conventional system since the diverted fuel jet impinges on the back side of the head of the valve element of the inlet valve. Thus, the highest lean limit in the conventional fuel injection system is low compared to the highest lean limit of the present embodiment.

Figure 5:
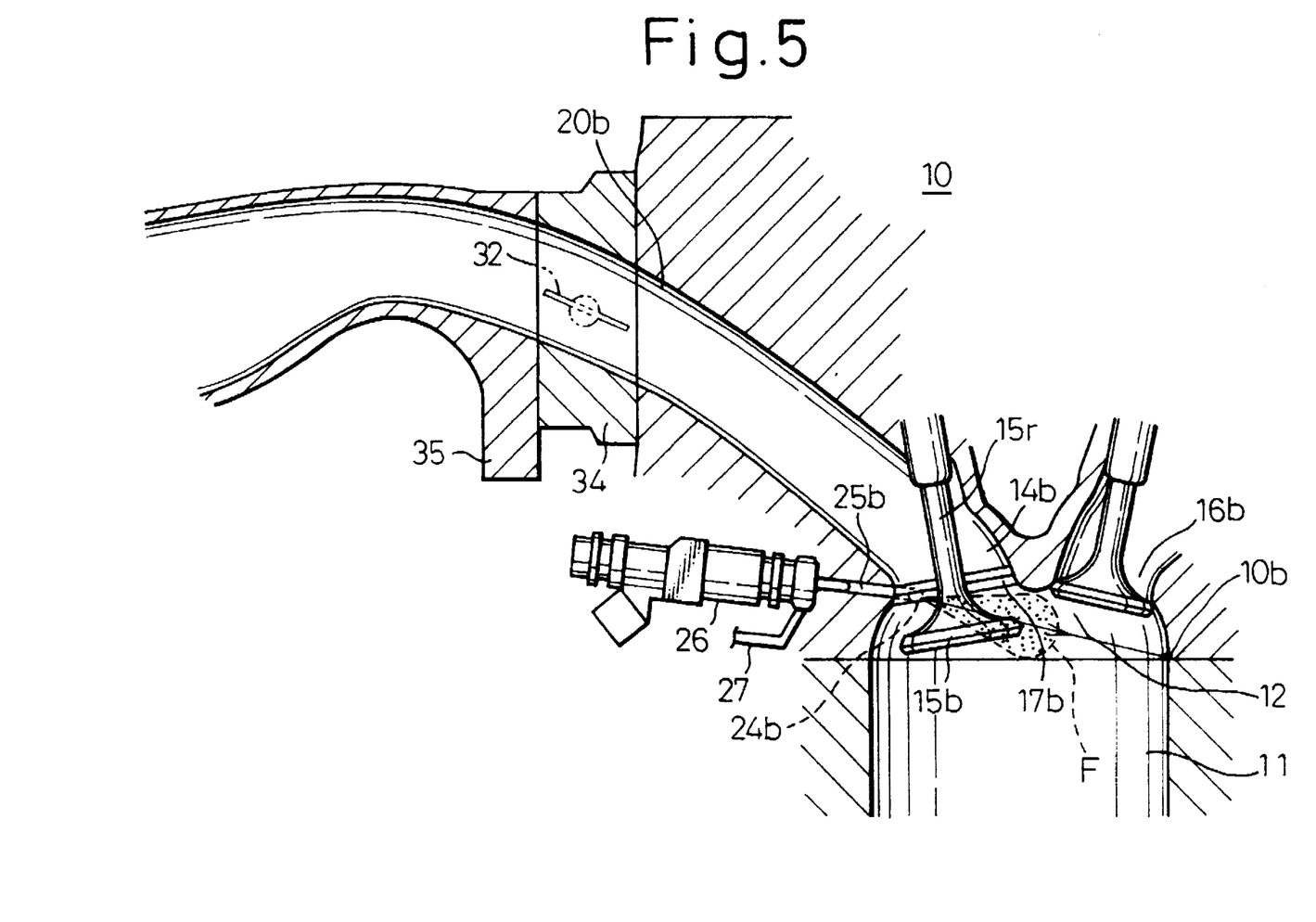
FIG. 5 is a drawing similar to FIG. 2 which illustrates another embodiment of the fuel injection system according to the present invention.

Next, another embodiment of the present invention is explained with reference to FIG. 5. FIG. 5 is a drawing similar to FIG. 2 which illustrates another embodiment of the fuel injection system according to the present invention. In FIG. 5, reference numerals the same as those in FIG. 2 represent the same elements. In this embodiment, the position of the fuel injection valve 26, the arrangements and directions of the fuel injection ports 24a, 24b and the fuel injection passages 25a, 25b are the same as those in FIGS. 1 and 2. However, in this embodiment, an assist air passage 27 is connected to the fuel injection passage 25a and 25b. The assist air passage 27 supplies pressurized air from an pressurized air source such as an air pump (not shown) to both of the fuel injection passage 25a and 25b. By supplying the assist air to the fuel injection passage 25b, fuel is injected from the fuel injection port 24b of the straight port in an atomized condition as indicated by F in FIG. 5. Further, since the fuel injection port 24b is disposed at the position adjacent to the upper edge of the valve seat of the inlet valve of the straight port 14b, this atomized fuel passes through the inlet valve without impinging on the valve element and reaches the center still region of the swirl in the cylinder. Therefore, a mixture of air and very fine mist of fuel is formed in the center part of the upper cylinder. The mixture of air and fine fuel mist is easily ignited by the spark plug, thereby, a stable combustion is obtained on an air-fuel mixture having higher air-fuel ratio than that of the embodiment in FIGS. 1 and 2.

In this embodiment, assist air is also supplied to the fuel injection passage 25a of the fuel injection port 24a of the swirl port 14a. Since fuel injection is carried out in the latter half of the intake stroke at which the velocity of the inlet air flow becomes low, the fuel injected from the fuel injection port 24a is not sufficiently atomized in some cases. Combustion of an insufficiently atomized fuel increases the amount of unburned hydrocarbon in the exhaust gas. In this embodiment, a stable combustion on an air-fuel mixture having high air-fuel ratio and reduction in hydrocarbon components in the exhaust gas are obtained at the same time by improving the atomization of the injected fuel.

Next, embodiments of the fuel injection system according to the present invention which include means for improving the atomization of the injected fuel are explained with reference to FIGS. 6 through 10.

Figure 6:
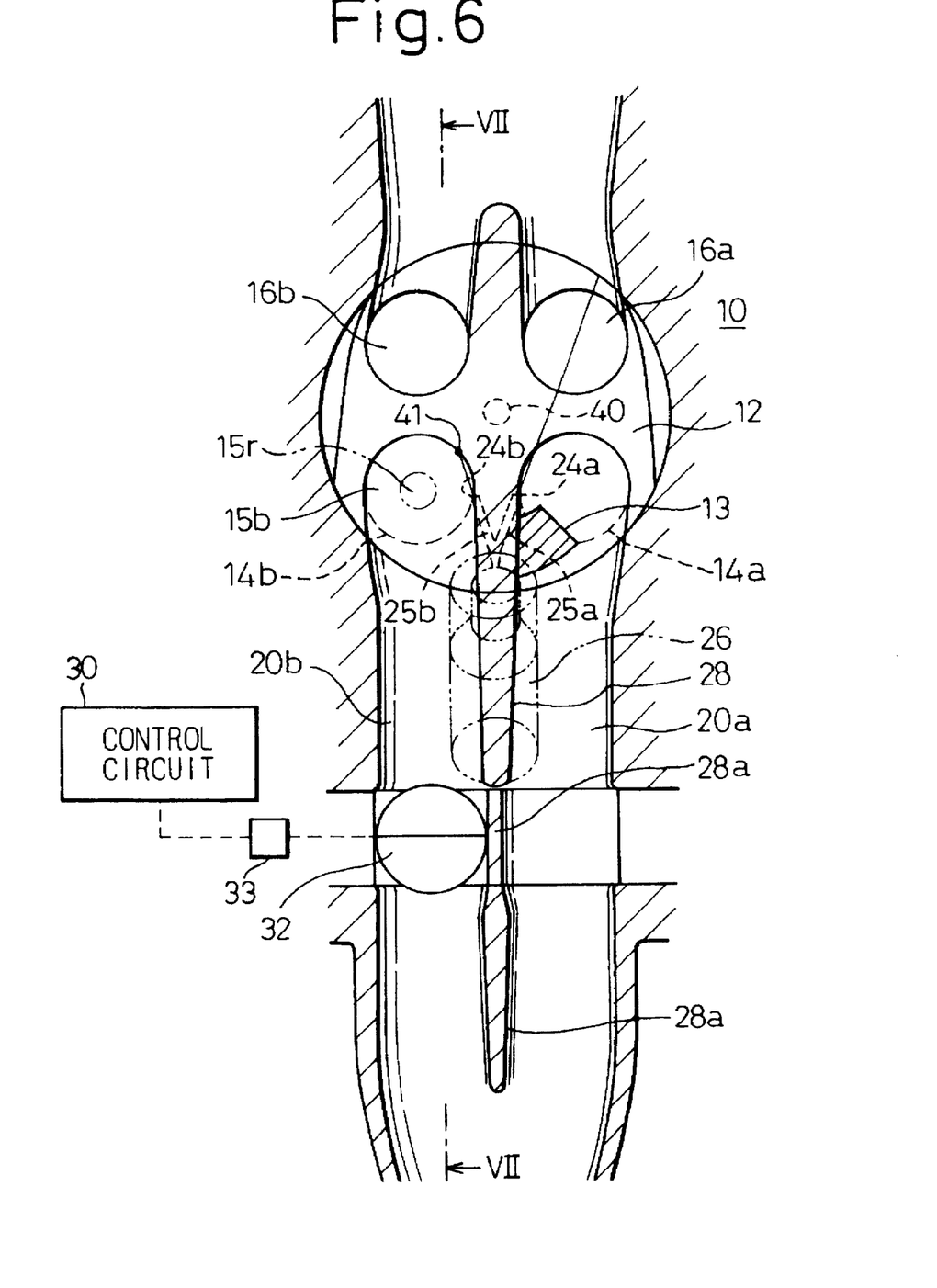
FIG. 6 is a drawing similar to FIG. 1 which illustrates another embodiment of the fuel injection system according to the present invention.
Figure 7:
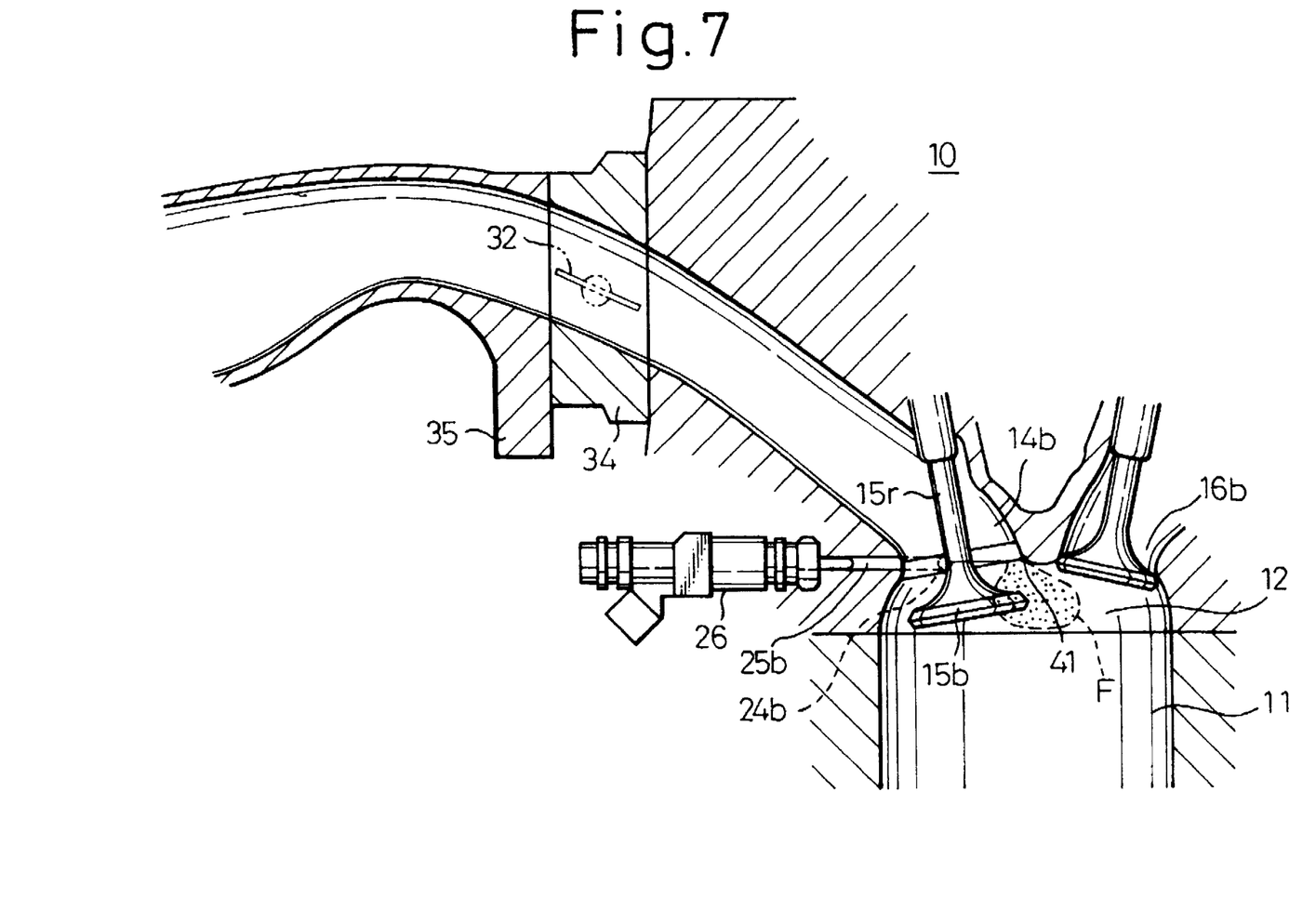
FIG. 7 shows a sectional view taken along the line VII—VII in FIG. 6.

FIGS. 6 and 7 are drawings similar to FIGS. 1 and 2, respectively, which illustrate another embodiment of the present invention. In FIGS. 6 and 7, reference numerals the same as those in FIGS. 1 and 2 represent the same elements. In this embodiment, the arrangements of the fuel injection valve 26 and the fuel injection ports 24a, 24b are also the same as those in FIGS. 1 and 2. However, in this embodiment, the direction of the fuel injection passage 25b and the fuel injection port 24b, i.e., the direction of fuel injection on the straight port 14b side is different from that of the embodiment in FIGS. 1 and 2.

As explained before, in the embodiment in FIGS. 1 and 2, the fuel injection passage 25b and the fuel injection port 24b are disposed in such a manner that fuel is injected in a direction between the valve stem 15r of the straight port inlet valve and the center axis of the cylinder 11 and toward the opposite wall of the cylinder head 10 or the upper part of the opposite wall of the cylinder 11. However, in the embodiment in FIGS. 6 and 7, direction of fuel injection is slightly upward compared to that in FIGS. 6 and 7, i.e., the fuel is injected from the fuel injection port 24a toward the lower edge of the inlet valve opening (the lower edge of the inlet valve seat) of the straight port 14a. By this arrangement, the fuel injected from the fuel injection port 24b of the straight port 14b hits the portion 41 of the lower edge of the inlet valve opening before entering the cylinder 11. As can be seen from FIG. 6, the portion 41 of the lower edge of the inlet valve opening is located at the nearest position to the center of the cylinder 11. Therefore, fuel impinges on the portion 41 of the lower edge of the inlet valve opening is atomized by the impingement, then directly reaches the center still region of the swirl in the cylinder as shown by reference F in FIG. 5. Thus, in this embodiment, the fuel injected from the fuel injection port 24b reaches the center still region of the swirl in the cylinder with improved atomized condition. Therefore, according to the present embodiment, the lean limit can be enlarged and, at the same time, the hydrocarbon component in the exhaust gas can be reduced without using the assist air.

Figure 8:
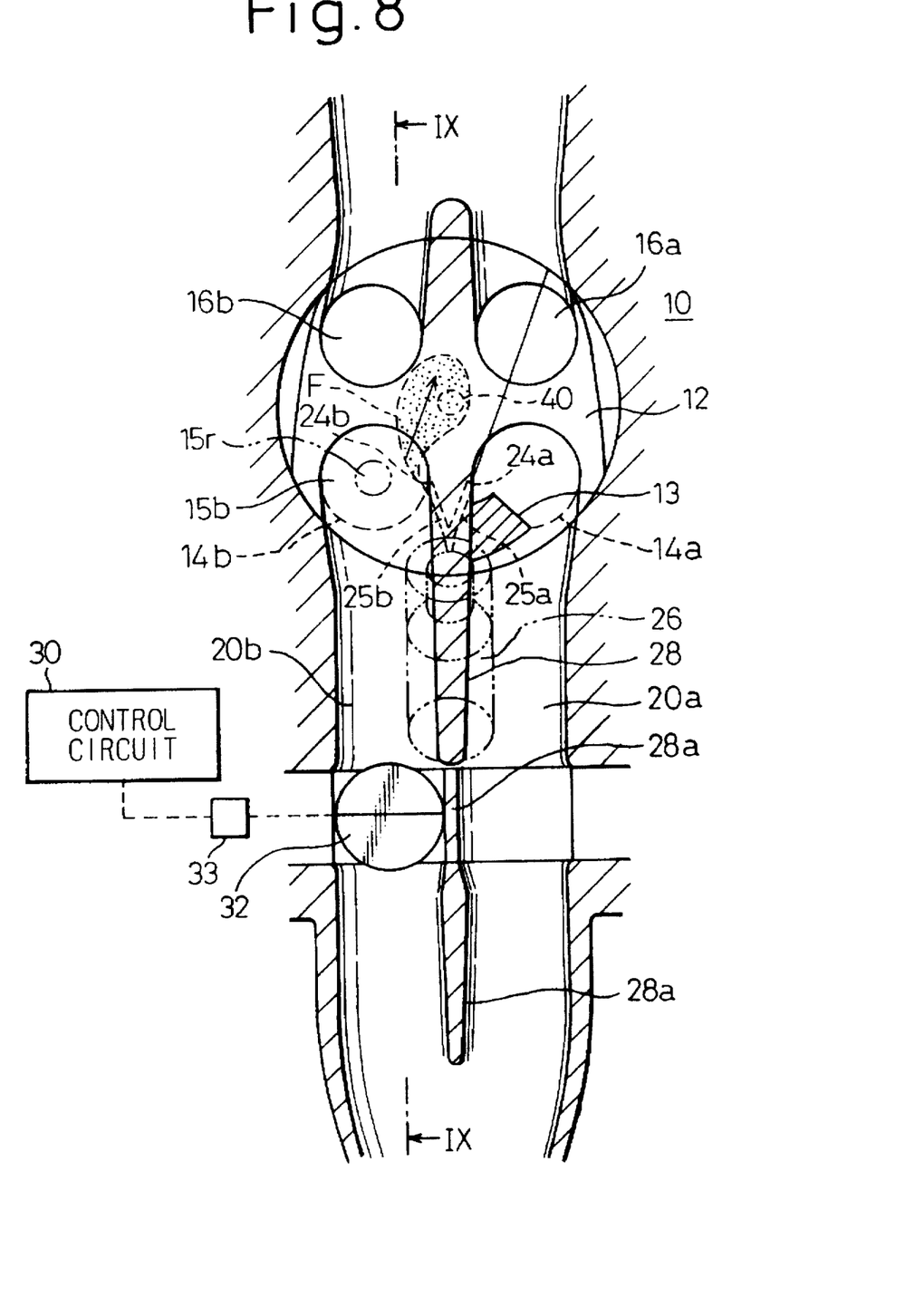
FIG. 8 is a drawing similar to FIG. 1 which illustrates another embodiment of the fuel injection system according to the present invention.
Figure 9:
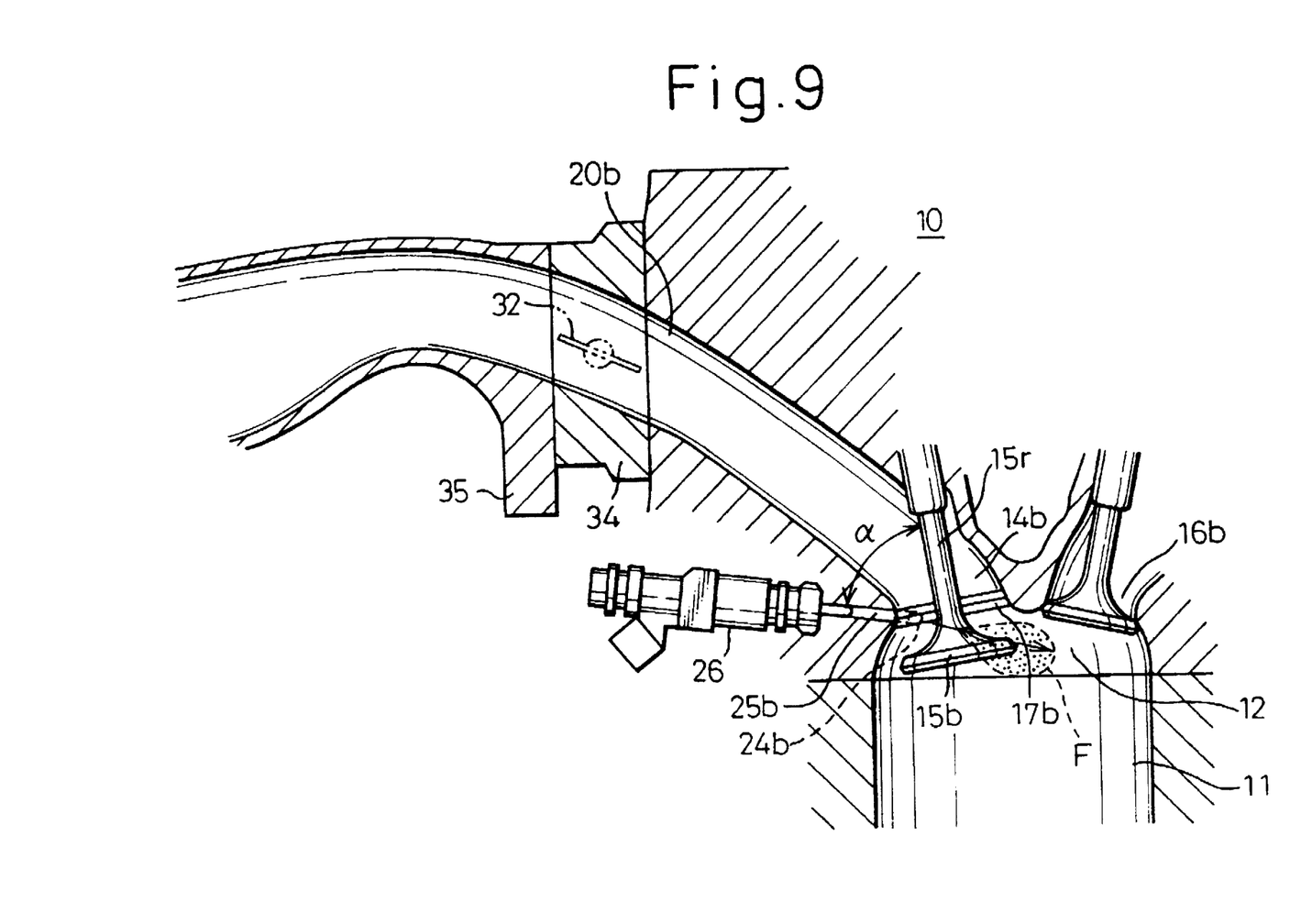
FIG. 9 shows a sectional view taken along the line IX—IX in FIG. 8.

FIGS. 8 and 9 illustrate another embodiment of the fuel injection system of the present invention which includes a means for improving the atomization of the fuel injected from the fuel injection port 24b. FIGS. 8 and 9 are drawings similar to FIGS. 1 and 2, respectively, and reference numerals the same as those in FIGS. 1 and 2 represents same elements. Further, the arrangements of the fuel injection valve 26, fuel injection port 24a and 24b are the same as those in FIGS. 1 and 2, also in this embodiment. In this embodiment, only the direction of fuel injection from the fuel injection passage 25b and the fuel injection port 24b is different from that of the embodiment in FIGS. 1 and 2.

In this embodiment, fuel is injected from the fuel injection port 24a toward the back side of the head of the valve element 15b in such a manner that fuel impinges on the back side of the head of the valve element 15b and changes its direction to the center of the cylinder 11. Namely, in this embodiment, fuel is first atomized by the impingement on the back side of the valve element head and is deflected in the direction to the center still region of the swirl in the cylinder.

FIG. 8 shows the direction of fuel injection on the plane perpendicular to the center axis of the cylinder 11 in this embodiment. As explained later, fuel is injected toward the surface area of the back side of the valve element bounded by a line connecting the center axis of the cylinder and the center axis of the stem 15r of the valve element and a line connecting the center axis of the stem 15r of the valve element and the fuel injection port 24a. When fuel impinges on the above-noted surface area of the head of the inlet valve, fuel is atomized by the impingement and deflects in the direction near the center axis of the cylinder 11. Therefore, after it impinges on the back side of the head of the inlet valve element, fuel reaches the center still region of the swirl in the atomized condition as shown by F in FIG. 8. This fuel stays the center still region and forms a mixture of air and a fine mist of fuel.

FIG. 9 shows the direction of fuel injection in this embodiment on the plane parallel to the center axis of the cylinder 11. As shown in FIG. 9, when it reflect on the back side surface of the head of the valve element 15b, fuel proceeds in a slightly upward direction compared to the original direction of injection from the fuel injection port 24a, and stays in the upper part of the combustion chamber 12, i.e., the portion around the spark plug. Namely, after impinging on the back side of the head of the valve element, the atomized fuel reaches the upper part of the center of the combustion chamber 12. Since the swirl is not formed in the center of the upper part of the combustion chamber 12, fuel which has reached this portion stays there and forms a mixture of air and a fine mist of fuel having a relatively rich ignitable air-fuel ratio.

Next, the required conditions for forming an ignitable air-fuel mixture in the center of the upper part of the combustion chamber is explained with reference to FIG. 10. Since the shape of the back side surface of the head of the valve element 15b is three-dimensional, the optimum direction of fuel injection from the fuel injection port 24b and the optimum part of the back side surface of the head of the valve element on which the injected fuel impinges change in accordance with the shape of the valve element, and they cannot be defined generally. Therefore, the optimum direction of the fuel injection and the place of impingement on the valve element must be determined by experiment using the actual valve element. However, the direction of the fuel injection and the part of the valve element on which the injected fuel impinges must satisfy the following conditions at a minimum.

Figure 10:
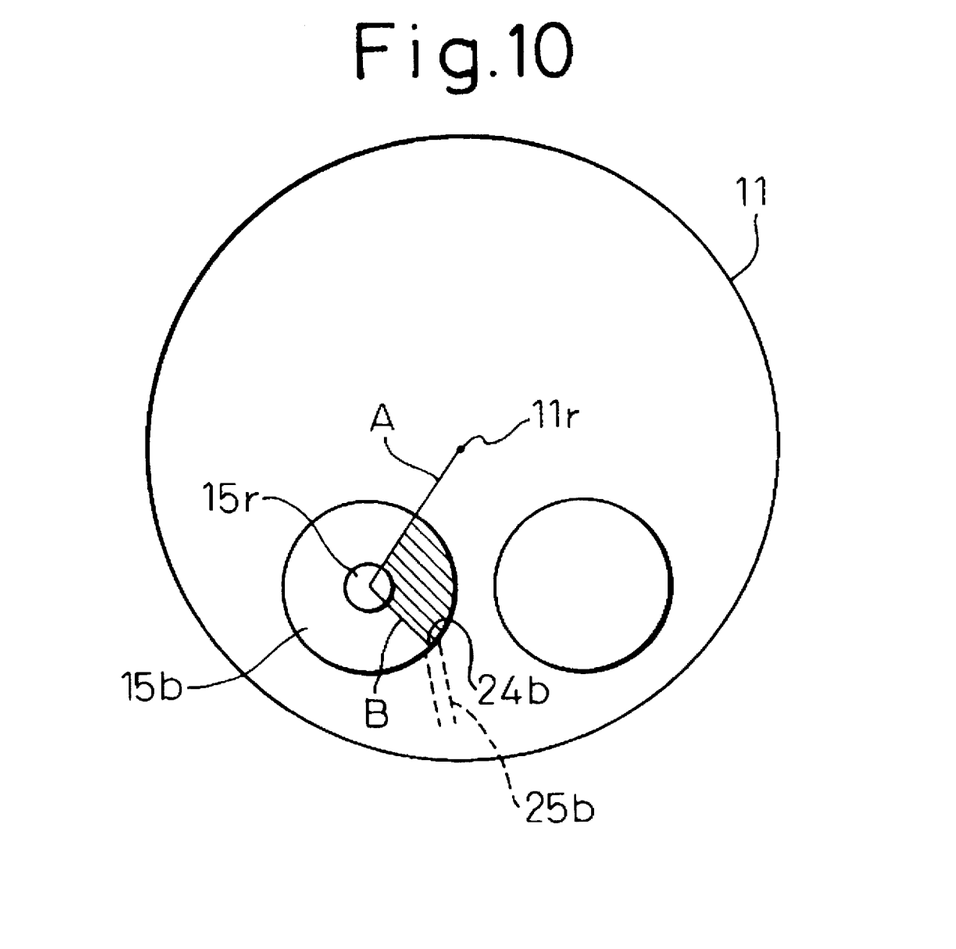
FIG. 10 is a drawing illustrating the direction of fuel injection in the straight port in the embodiment in FIGS. 8 and 9.

First, the fuel injected from the fuel injection port 24b must impinge on the part of the back side surface of the head of the valve element indicated by the hatched area in FIG. 10. This area is defined by the line A in FIG. 10 connecting the center axis of the stem 15r of the valve element 15b and the center axis 11r of the cylinder 11 and the line B in FIG. 10 connecting the stem 15r and the fuel injection port 24b. If the fuel injected from the fuel injection port 24b impinges on the back side surface of the head of the valve element outside of this area, fuel may deflect in the direction away from the center axis 11r, and the deflected fuel may not reach the center of the combustion chamber 12. Therefore, the fuel injection passage 25b and the fuel injection port 24b must be arranged so that the injected fuel is directed to this area of the back side of the head of the valve element.

Further, the direction of fuel injection is preferably nearly perpendicular to the center axis of the cylinder 11. Namely, the angle of incidence α of the injected fuel with respect to the valve element (the angle between the fuel injection passage 25b and the center axis of the stem 15r of the valve element; refer to FIG. 9) is preferably set as large as possible. When the angle of incidence α is small, fuel deflected from the back side surface of the valve element proceeds upwards and, thereby, the amount of fuel sticking to the top surface of the combustion chamber (and to the spark plug) increases. This may cause the spark plug to be wetted by fuel. Therefore, it is preferable to set the direction of fuel injection as perpendicular to the center axis of the cylinder as possible. The optimum range of the angle of incidence α also changes in accordance with the shape of the valve element. Therefore, the angle of incidence α is preferably determined based on the actual shape of the valve element.

As explained above, according to the present invention, fuel is effectively stratified in the radial direction of the cylinder so that an air-fuel mixture of an ignitable air-fuel ratio is formed around the spark plug while keeping the air-fuel ratio of the air-fuel mixture in the cylinder as a whole at a lean air-fuel ratio.

We claim:

1. A fuel injection system for a lean burn engine, said engine comprising cylinders, each equipped with a conventional straight inlet port and a swirl inlet port which generates a swirl of inlet air flowing therethrough into the cylinder, a first inlet air passage connected to the straight inlet port, a second inlet air passage connected to the swirl inlet port, and a swirl control valve disposed in the first inlet air passage for blocking the first inlet air passage when the engine is operated at a predetermined operating condition;

the fuel injection system comprising a fuel injection valve equipped with two injection holes which are connected to a straight port fuel injection port disposed on the wall of the straight inlet port and a swirl port fuel injection port disposed on the wall of the swirl inlet port, and which inject fuel into the straight inlet port and the swirl inlet port through the respective fuel injection ports, wherein, said fuel injection valve injects fuel in a latter half of the intake stroke, at least when the swirl control valve is being closed, said straight port fuel injection port is disposed at a position adjacent to the inlet valve seat of the straight inlet port and injects fuel in the direction between the center axis of the cylinder and the stem of the inlet valve element toward the opposite wall of the cylinder head or the upper part of the opposite cylinder wall.

2. A fuel injection system according to claim 1, further comprising an air assist means for supplying pressurized air, at least, into a fuel injection passage connecting said straight port fuel injection port and the corresponding injection hole of the fuel injection valve.

3. A fuel injection system for a lean burn engine, said engine comprising cylinders, each equipped with a conventional straight inlet port and a swirl inlet port which generates a swirl of inlet air flowing therethrough into the cylinder, a first inlet air passage connected to the straight inlet port, a second inlet air passage connected to the swirl inlet port, and a swirl control valve disposed in the first inlet air passage for blocking the first inlet air passage when the engine is operated at a predetermined operating condition;

the fuel injection system comprising a fuel injection valve equipped with two injection holes which are connected to a straight port fuel injection port disposed on the wall of the straight inlet port and a swirl port fuel injection port disposed on the wall of the swirl inlet port, and which inject fuel into the straight inlet port and the swirl inlet port through the respective fuel injection ports, wherein, said fuel injection valve injects fuel in a latter half of the intake stroke, at least when the swirl control valve is being closed, said straight port fuel injection port is disposed at a position adjacent to the inlet valve seat of the straight inlet port and injects fuel in the direction between the center axis of the cylinder and the stem of the inlet valve element pointing at the lower edge of the inlet valve seat of the straight inlet port.

4. A fuel injection system for a lean burn engine, said engine comprising cylinders, each equipped with a conventional straight inlet port and a swirl inlet port which generates a swirl of inlet air flowing therethrough into the cylinder, a first inlet air passage connected to the straight inlet port, a second inlet air passage connected to the swirl inlet port, and a swirl control valve disposed in the first inlet air passage for blocking the first inlet air passage when the engine is operated at a predetermined operating condition;

the fuel injection system comprising a fuel injection valve equipped with two injection holes which are connected to a straight port fuel injection port disposed on the wall of the straight inlet port and a swirl port fuel injection port disposed on the wall of the swirl inlet port, and which inject fuel into the straight inlet port and the swirl inlet port through the respective fuel injection ports, wherein, said fuel injection valve injects fuel in a latter half of the intake stroke, at least when the swirl control valve is being closed, said straight port fuel injection port is disposed at a position adjacent to the inlet valve seat of the straight inlet port and injects fuel toward the back side of the valve element of the inlet valve of the straight inlet port in such a manner that the injected fuel hits the surface area of the back side of the valve element bounded by a line connecting the center axis of the cylinder and the center axis of the stem of the valve element and a line connecting the center axis of the stem of the valve element and the straight port fuel injection port and fuel deflected on said surface area approaches the center axis of the cylinder.

* * * * *